US010650134B2

(12) United States Patent
Schiller et al.

(10) Patent No.: US 10,650,134 B2
(45) Date of Patent: May 12, 2020

(54) DISCREET USER IDENTIFICATION AND MULTIPLE DEVICE MODES OF OPERATIONS

(71) Applicant: INTERNATIONAL BUSINESS MACHINES CORPORATION, Armonk, NY (US)

(72) Inventors: Michael David Schiller, Travis, TX (US); Adam Yoho, Austin, TX (US); Wilalberto Rodriguez, Austin, TX (US); Paul W. Bennett, Williamson, TX (US); David Y. Chang, Travis, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/872,297

(22) Filed: Jan. 16, 2018

(65) Prior Publication Data
US 2019/0220584 A1    Jul. 18, 2019

(51) Int. Cl.
*G06F 21/40* (2013.01)
*G06F 21/31* (2013.01)
*G06F 21/32* (2013.01)

(52) U.S. Cl.
CPC .............. *G06F 21/40* (2013.01); *G06F 21/31* (2013.01); *G06F 21/316* (2013.01); *G06F 21/32* (2013.01); *G06F 2221/2149* (2013.01)

(58) Field of Classification Search
CPC .......... G06F 21/40; G06F 21/31; G06F 21/32; G06F 21/316; G06F 2221/2149
See application file for complete search history.

(56) References Cited

U.S. PATENT DOCUMENTS

| 7,665,146 | B2 | 2/2010 | Munje et al. | |
|---|---|---|---|---|
| 8,260,720 | B1 | 9/2012 | Dixon et al. | |
| 8,832,465 | B2 | 9/2014 | Gulati et al. | |
| 9,195,388 | B2* | 11/2015 | Shepherd | G06F 3/0482 |
| 9,778,837 | B2* | 10/2017 | Shepherd | G06F 3/0482 |
| 10,298,563 | B2* | 5/2019 | Esdaile | H04L 63/0823 |
| 10,298,743 | B2* | 5/2019 | Baek | H04L 67/22 |
| 2004/0248550 | A1* | 12/2004 | Hausner | H04L 63/08 |
| | | | | 455/410 |
| 2005/0004871 | A1 | 1/2005 | Dort | |
| 2010/0225443 | A1 | 9/2010 | Bayram et al. | |
| 2015/0156308 | A1* | 6/2015 | Jang | H04M 1/656 |
| | | | | 455/411 |

(Continued)

OTHER PUBLICATIONS

Hoffman, "What is "Lost Mode" on the iPhone, iPad, or Mac?", Jul. 19, 2018, p. 1-8.*

(Continued)

*Primary Examiner* — Christopher A Revak
(74) *Attorney, Agent, or Firm* — Heslin Rothenberg Farley & Mesiti P.C.; Christopher Pignato, Esq.

(57) ABSTRACT

Computer implemented methods are presented. The methods include, for instance: obtaining a user credential for login to a mobile device from a user. By use of a multilayered authentication, based on the user credential, and a discreet user identity verification, the user determined to be unauthorized would operate the mobile device in a precaution mode, which discreetly creates secure records of activities of the user.

20 Claims, 6 Drawing Sheets

(56) References Cited

U.S. PATENT DOCUMENTS

| | | | | |
|---|---|---|---|---|
| 2015/0347738 | A1* | 12/2015 | Ulrich | G06F 21/34 726/17 |
| 2016/0381552 | A1* | 12/2016 | Jakobsson | H04M 1/72577 455/411 |
| 2019/0140778 | A1* | 5/2019 | Kishikawa | G07C 5/085 |
| 2019/0273736 | A1* | 9/2019 | Esdaile | H04L 63/0876 |
| 2019/0289013 | A1* | 9/2019 | Makmel | G06F 21/40 |

OTHER PUBLICATIONS

Jakobsson, M., et al., "Implicit Authentication for Mobile Devices", retrieved from Internet URL: <https://www.usenix.org/legacy/event/hotsec09/tech/full_papers/jakobsson.pdf >, HotSec '09, Aug. 11, 2009, 6 pgs., Montreal, Canada.

Jackson, W., "Finally, an alternative to the tyranny of passwords?", DARPA's proposal to dump passwords for biometric, behavioral authentication would be a welcome change—GCN [retrieved on Nov. 1, 2017]. Retrieved from the Internet URL: <https://gcn.com/articles/2012/05/07/cybereye-darpa-biometric-passwords.aspx>, Cybereye, Apr. 16, 2012, 2 pgs.

"Deletion As Punishment" [retrieved on Nov. 2, 2017]. Retrieved from the Internet URL: <http://tvtropes.org/pmwiki/pmwiki.php/Main/DeletionAsPunishment>, TV Tropes, 1 pg.

"Fake Delete: pretend to delete but forward record to approver instead" [retrieved on Nov. 2, 2017]. Retrieved from the Internet URL: <https://success.salesforce.com/ideaView?id=08730000000BpKI>, 2 pgs.

"iOS Security iOS 10", Mar. 2017, retrieved from the Internet URL: <https://www.apple.com/business/docs/iOS_Security_Guide.pdf>, 68 pgs.

Spector, L., "How to recover deleted files". Retrieved from the Internet URL: <http://www.pcworld.com/article/2147668/how-to-recover-deleted-files.html>, May 5, 2014, 4 pgs.

Lord, R., "PlayStation promo crashes through", May 31, 1998, 4 pgs.

"iOS Security iOS 9.3 or later", Mar. 2016, 63 pgs.

Mell, Peter, et al., "The NIST Definition of Cloud Computing", NIST Special Publication 800-145, Sep. 2011, Gaithersburg, MD, 7 pgs.

* cited by examiner

DISCREET USER IDENTIFICATION AND MULTIPLE DEVICE MODES OF OPERATIONS

TECHNICAL FIELD

The present disclosure relates to mobile device technology, and more particularly to methods, computer program products, and systems for differentiating operation modes of devices according to multi-layered authentication.

BACKGROUND

Existing user authentication methods used for mobile devices are password and information otherwise privy to an owner of a mobile device. After a user gains access through a certain authentication set for the mobile device, the user may perform many types of activities and online transactions, as if the user is the owner of the mobile device. Further, because there are numerous transactions that may be performed via just as many mobile device apps, mobile device usage security is a significant matter.

SUMMARY

The shortcomings of the prior art are overcome, and additional advantages are provided, through the provision, in one aspect, of a method. The method for providing a plurality of modes of operations on a mobile device includes, for instance: obtaining, by one or more processor, a user credential for login to the mobile device from a user; ascertaining that the user is unauthorized to use the mobile device by use of a multi-layered authentication and a discreet user identity verification; and performing operations on the mobile device according to predefined modes configurations corresponding to respective operations in a precaution mode, such that the mobile device may keep a secure record of the operations performed during a login session in the precaution mode, where the predefined modes configurations have respective operations in the precaution mode and a standard mode, for each activity requested on the mobile device, and wherein presence of the secure record is unknown to the user.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
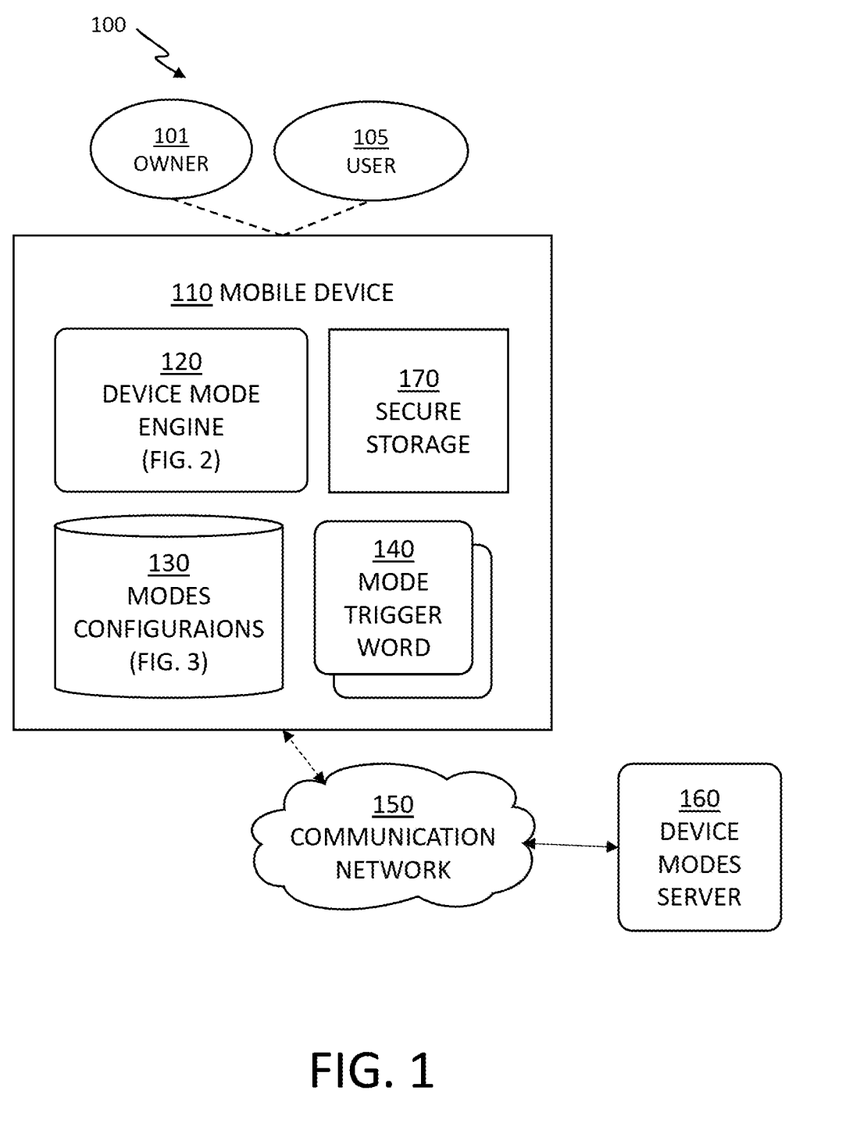
FIG. 1 depicts a system for differentiating device modes of operation based on multi-layered authentication, in accordance with one or more embodiments set forth herein.

FIG. 1 depicts a system 100 for differentiating device modes of operation based on multi-layered authentication, in accordance with one or more embodiments set forth herein.

As noted, existing security measures for mobile devices include password-based user authentication methods. Such information may be disclosed to others either under duress or by carelessness. Accordingly, user authentication using only a password may be inadequate in circumstances where mobile devices are used for numerous digital transactions as well as for personal and social purposes. Also, mobile applications provide more and more functionalities, and often users are to verify user identities with mobile devices, where such inadequate authentication of users may pose substantial risk for financial loss or physical safety of the users. Further, certain embodiments of the present invention recognize that mobile device owners may be repeatedly forced to let others use the mobile device, to avoid adverse effects that may be caused by any confrontation and/or disagreement, as often observed in domestic relationships. Accordingly, the same embodiments of the present invention operate seemingly normally during such login sessions but perform various functionalities to prevent any escalation between aforementioned parties and to keep records of such login sessions.

The system 100 includes a mobile device 110 coupled to a device modes server 160 via a communication provider network 150. Examples of the mobile device 110 may include, but are not limited to, a smartphone. The mobile device 110 includes a device mode engine 120, modes configurations 130, and one or more mode trigger words 140. The mobile device 110 further includes a secure storage 170 for storing records backed up by the device mode engine 120.

The device mode engine 120 is meant to promote non-violent resolutions of risks posed by unauthorized users gaining access to personal mobile devices of others. In circumstances such as domestic disputes, false imprisonment, or attempted larceny by forcing disclosure of information having any monetary value such as mobile banking login credentials, unauthorized users may pose more danger to the safety of an owner 101 of the mobile device 110 if the owner 101 does not accommodate the unauthorized users with access to the mobile device 110. The device mode engine 120 serves to keep the record of activities performed by the unauthorized users and to ensure safety of the owner 101 of the mobile device 110. The records kept by the device mode engine 120 may be utilized to locate the mobile device 110, the owner 101, and/or the unauthorized users, to document a course of events, to later recover deleted data for the owner when safety is assured, and later to prove the actions of the unauthorized users.

The device mode engine 120 differentiates a mode of operation of the mobile device 110, based on multi-layered user authentication when a user 105 logged in. As noted, the owner 101 owns the mobile device 110. The device mode engine 120 determines whether or not the user 105 who attempts to use the mobile device 110 is the owner 101, as an added security measure. According to the identity of the user 105, the device mode engine 120 operates under respectively preconfigured modes, which are stored as the modes configurations 130. Also, during the authentication or after the user 105 successfully logs in, the user 105 may signal to switch the device mode by use of one or more mode trigger words 140. Details on operations of the device mode engine 120 are presented in FIG. 2 and corresponding description.

In one embodiment of the present invention, the device mode engine 120 may provide two (2) modes of operations: a standard mode and a precaution mode. In the same embodiment, the modes configurations 130 may include respective mobile device operations for each mode. The device mode engine 120 screens all inputs and checks if one or more mode trigger words 140 were input, at which time the device mode of operation is switched to a respectively corresponding mode of operation. In certain embodiments of the present invention, mode trigger words 140 may be implemented as a special type of user credential referred to as a duress password, such that if the user 105 inputs the duress password, the device mode engine 120 may begin operating in the precaution mode immediately without additional user authentication.

For example, if the owner 101 is aware of a danger posed by a specific individual who frequently uses a certain word but the owner 101 rarely uses the same word, then the owner 101 may set the word as one of the mode trigger words 140 such that the device mode engine 120 switches to the precaution mode when the word is spoken within a certain proximity of the mobile device 110.

Current user authentication methods to unlock mobile devices include providing user credentials such as passwords, passcodes, and/or geometric patterns. As accesses to mobile devices may enable accesses to various online transactions, online accounts and activities that are supported via mobile applications on the mobile devices, it is beneficial to ensure that only authorized users may access certain mobile devices and to prevent such unrestricted usage of the same mobile devices by unauthorized users. Due to the nature of various user authentication methods, however, some may gain access to mobile devices of others by forcing owners to disclose user credentials. Embodiments of the present invention offers multi-layered authentication in order to discreetly verify user identity, such that in the case where the mobile device is being accessed by an unauthorized user, the mobile device may operate in a precaution mode without the user's knowledge.

In the precaution mode, the device mode engine 120 records activities performed by the unauthorized user on the mobile device 110 and generates track records of surroundings of the mobile device 110, as configured in the modes configurations 130. The records may be stored with the device modes server 160 via the communication network 150 when available. When the communication network 150 is not available or otherwise necessary, the device mode engine 120 stores the records generated in the precaution mode in the secure storage 170 within the mobile device 110.

The secure storage 170 may be a component of a memory 28 of FIG. 4 below, where the mobile device 110 is an embodiment a computing node 10 of FIG. 4. However, the secure storage 170 is a system memory space that is neither visible nor accessible by any end user. Accesses to the secure storage 170 is reserved only for operating system (OS) utilities including the device mode engine 120, for the purpose of keeping confidential data with respect to usage of the mobile device 110 such as user credentials, passwords, biometric data, as well as records of activities in the precaution mode. In order to access the secure storage 170, the device mode engine 120 includes secure system memory access application programming interfaces (APIs) for a respective mobile operating system (OS) of the mobile device 110 on which the device mode engine 120 is implemented. Examples of mobile operating systems may include, but are not limited to, Android and iOS.

The device mode engine 120 may later transmit records stored in the secure storage 170 to the device modes server 160 when the communication network 150 becomes available. Examples of operations in both the standard mode and the precaution mode are presented in FIG. 3 and corresponding description.

In addition to activities differentiated from respectively corresponding activities in the standard mode, the precaution mode may further include an alert to authorities to get help for the authorized users including the owner 101, based on preconfigured parameters, such as a certain duration of the precaution mode, a threshold frequency of the precaution mode, a code word, a certain geographic location, etc. The device mode engine 120 may be utilized to collect and to reserve digital evidences on the mobile device 110 by keeping records of activities while in precaution mode, and to ensure safety of the owner 101 by alerting police if necessary.

Existing personal safety measures in personal devices are to be turned on to work in moments of need. Contrastingly, the precaution mode would be preconfigured for automatically keeping various records and alerting authorities, even if the authorized users are blocked from the mobile device 110.

In one embodiment of the present invention, the device mode engine 120 is implemented as a part of an operating system of the mobile device 110, to keep the precaution mode invisible to end users of the mobile device 110. The device mode engine 120 may not be implemented as an ordinary downloadable mobile app because the presence of the device mode engine 120 is to be kept confidential to all unauthorized users, and accordingly may not be a matter of public knowledge. Also, because the secure storage 170 is not a user memory space but needs to be allocated in a system memory space of the mobile device 110, the device mode engine 120 is to have system memory access, which is available only to operating system components and system utilities. In the alternative, the operating system of the mobile device 110 handles the device mode engine 120 with a certain priority/file management flag such that all data files created and/or copied by the device mode engine 120 is kept invisible to all end users, but accessed only from the device mode engine 120 for the sake of the owner 101.

Existing security measures on mobile devices may include: misrepresenting information and/or notifying a company maintaining an account for financial transactions without tracking unauthorized usage or taking the safety of the owner into account; data access blocking by false display, data removal; transaction manipulation and target redirection as in deposit to a designated intermediary account in fraudulent wire transfers without tracking unauthorized usage or taking the safety of the owner into account; authentication lock after a certain number of failed attempt to login without taking the safety of the owner into account; and a camouflage application that has a secret alert functionality which should be activated by a user without tracking unauthorized usage.

Some embodiments of the present invention may include one, or more, of the following features, characteristics, advantages and/or operations: (i) when data is to be temporarily removed from user memory space of the mobile device, it may be temporarily stored in the secure storage 170; and/or (ii) original data is moved from its storage location to some other separate storage location that is accessible only through the device mode engine 120.

Some embodiments of the present invention may include one, or more, of the following features, characteristics, advantages and/or operations: (i) stateful operations with multiple precaution mode sessions, in which the service mode engine 120 keeps track of states of respective precaution modes by logging respective identities of unauthorized users, precaution mode session identification, and activity logs for each unauthorized user, in order to maintain coherency with respect to content of the mobile device 110 in cases of multiple accesses by multiple unauthorized users, such that each unauthorized user would not notice a recovery of any files previously deleted by a same unauthorized user from a previous precaution mode session on the mobile device 110; (ii) in the precaution mode, data is deleted normally as in the standard mode without any visible difference from normal confirmation settings for file deletion; (iii) in the precaution mode, the data is seemingly immediately deleted as in normal usages with no perceivable time delay caused by creating a secure copy by the device mode engine 120; and (iv) it is technically infeasible for any end user to verify that the data has been erased from the mobile device because of the secure storage 170 is allocated within the system memory invisible to end users.

Figure 2:
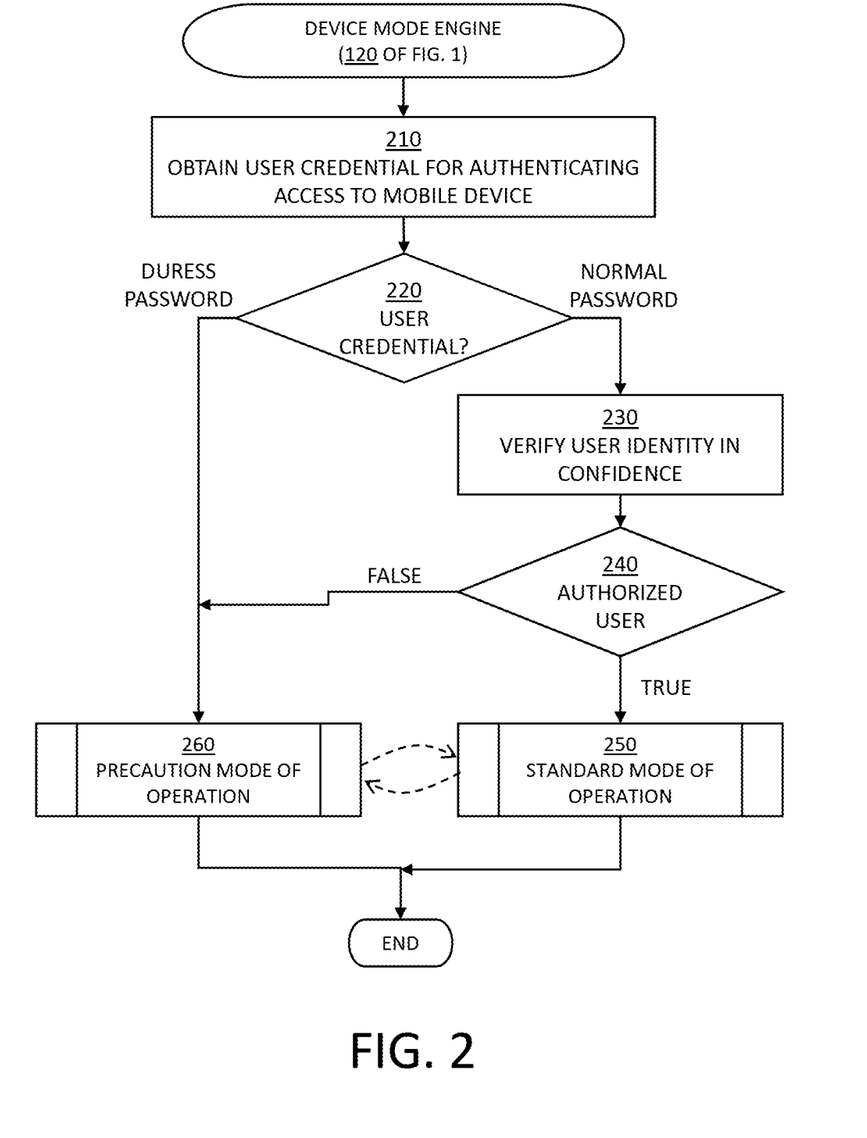
FIG. 2 depicts a flowchart of operations performed by the device mode engine, in accordance with one or more embodiments set forth herein.

FIG. 2 depicts a flowchart of operations performed by the device mode engine 120 of FIG. 1, in accordance with one or more embodiments set forth herein.

As noted, the device mode engine 120 utilizes a discreet user verification integrated into a system default authentication method employed by the mobile device. In certain embodiments of the present invention, the device mode engine 120 is installed on the mobile device at an operating system level for added security, particularly with respect to digital trace and transaction data logging.

In block 210, the device mode engine 120 obtains a user credential as a user attempts to use a mobile device. The user credential may be directed to the system default authentication method such as a device password. The user credential may be utilized to alert the device mode engine 120 that the user is in danger or otherwise the mobile device has been compromised by using a special password during a login. Then the device mode engine 120 proceeds with block 220.

In block 220, the device mode engine 120 examines the user credential obtained in block 210. If the device mode engine 120 determines that the user credential is a normal password, then the device mode engine 120 proceeds with block 230. If the device mode engine 120 determines that the user credential is a duress password, then the device mode engine 120 proceeds with block 260.

In cases where the authentication input is neither the normal password nor the duress password, the user may not gain access to the mobile device at all, and may loop back to block 210 for another attempt. Such cases of authentication failure are not shown in FIG. 2 as the device mode engine 120 does not concern failed authentications. The device mode engine 120 supports the duress password in order not to alert unauthorized users in login attempts to the mobile device 110, as failure with authentication may elevate into circumstances that may have an adverse effect to safety of the owner 101.

In block 230, the device mode engine 120 discreetly verifies identity of the user, without alerting the user of the identity verification. Various methods may be utilized for discreet verification of the user identity, including, but not limited to, 3D touch pattern recognition, a facial image capture with a device camera and processing by facial recognition, or a voice capture with a device microphone and voice analysis. As noted, the device mode engine 120 checks the identity of the user because the user may have forced the owner of the mobile device to disclose the user credential in order to gain access to the mobile device. Accordingly, the device mode engine 120 utilizes verification methods that would not alert the user in verifying the user identity. In one embodiment of the present invention, the device mode engine 120 activates a device camera, captures a facial image of the user, and runs a facial recognition process to verify if the user is the owner or otherwise authorized user. Then the device mode engine 120 proceeds with block 240.

In block 240, the device mode engine 120 determines whether or not the user as verified in block 230 is authorized to use the mobile device. If the device mode engine 120 determines that the user is an authorized user, then the device mode engine 120 proceeds with block 250. If the device mode engine 120 determines that the user is not an authorized user, then the device mode engine 120 proceeds with block 260.

In block 250, the device mode engine 120 operates in a standard mode of operation, in which user activities are processed according to operations configured for the standard mode. In the standard mode of operation, the mobile device 110 performs activities normally, mostly according to device settings and app settings. The device mode engine 120 continues performing the user activities according to the standard mode configuration, until a session authenticated in block 210 is over, or until a trigger word for a precaution mode is input. If the device mode engine 120 detects the trigger word for the precaution mode while operating in the standard mode, then the device mode engine 120 switches to the precaution mode of operation. As in conventional mobile device use control, the mobile device would be locked after a preconfigured period of inactivity, or being turned off and turned back on, and then another authentication sequence would be prompted for any user to access the mobile device, where the device mode engine 120 loops back to block 210. Examples of operations in the standard mode of operation are presented in FIG. 3 and corresponding description.

In block 260, the device mode engine 120 operates in the precaution mode of operation, in which user activities are processed according to operations configured for the precaution mode. As noted in block 230, the device mode engine 120 discreetly verifies the user identity and switches to the precaution mode of operation, without alerting the user who is not one of the authorized users. The device mode engine 120 associates the user identity, either verified in block 230 or checked out upon entering the precaution mode in block 260, with the login session in the precaution mode. If the user 105 is an unauthorized user, the device mode engine 120 also keeps an activity log for each login session, as well as the login history of the unauthorized user. In cases where there are multiple unauthorized users, the device mode engine 120 matches each login session, operating in the precaution mode, to the respectively identified unauthorized user, such that the unauthorized user may see content of the mobile device 110 as consistent with the previous login by the same unauthorized user.

In the precaution mode, as shown in the example of the modes configurations of FIG. 3 below, the device mode engine 120 keeps records of activities performed by the unauthorized user or surveillance data on surroundings of the mobile device. In order to store the activity records and the surveillance data, the device mode engine 120 utilizes the secure storage 170 on the mobile device 11 temporarily, and/or transmits the activity records and the surveillance data to the device modes server 160 when the communication network 150 becomes available. The device mode engine 120 still performs activities requested by the unauthorized user on the mobile device without any delay not present in the standard mode. This is because alerting the unauthorized user of surveillance performed in the precaution mode may cause physical and/or emotional harm to the owner or the authorized users.

Upon receiving the activity records and/or the surveillance data from the device mode engine 120 on the mobile device 110, the device modes server 160 stores the received activity records and/or the surveillance data in a secure repository coupled to the device modes server 160, or uploads to a cloud. Prior to uploading to the cloud, the device modes server 160 marks the activity records and/or the surveillance data as inaccessible from search engines or any other type of user access. The uploaded activity records and/or the surveillance data are only to be accessed by the owner 101 or authorized users via the device modes server 160 and the device mode engine 120. For example, in case where the unauthorized user deletes a photo from the mobile device 110, then the device mode engine 120 and the device modes server 160 create a copy of the photo, delete the photo from the mobile device 110, and securely store the photo such that the unauthorized user who deleted the photo may not later discover the photo from either on the mobile device 110 or the Internet.

The device mode engine 120 continues processing the user activities and creating the surveillance data according to the precaution mode configuration, until a session authenticated in block 210 is over, or until a trigger word for the standard mode is input. If the device mode engine 120 detects the trigger word for the standard mode while operating in the precaution mode, then the device mode engine 120 switches to the standard mode of operation. As in conventional mobile device use control, the mobile device would be locked after a preconfigured period of inactivity, or being turned off and turned back on, and then another authentication sequence would be prompted for any user to access the mobile device, where the device mode engine 120 loops back to block 210. Examples of operations in the precaution mode of operation, in comparison to the operations in the standard mode of operation as noted above, are presented in FIG. 3 and corresponding description.

Figure 3:
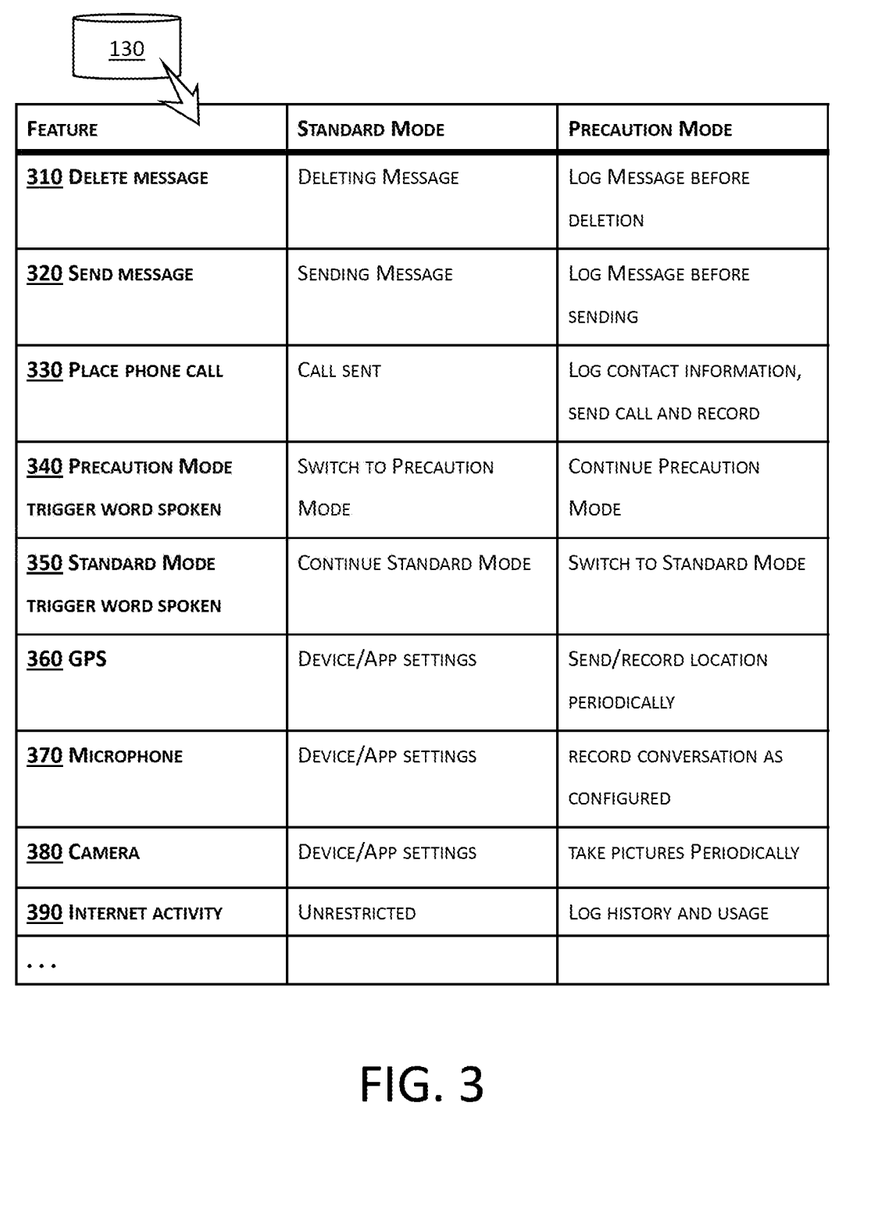
FIG. 3 depicts an exemplary instance of the modes configurations 130 of FIG. 1, in accordance with one or more embodiments set forth herein.

FIG. 3 depicts an exemplary instance of the modes configurations 130 of FIG. 1, in accordance with one or more embodiments set forth herein.

As noted, the device mode engine 120 is to promote nonviolent resolutions of risks posed by unauthorized users gaining access to personal mobile devices of others. Accordingly, the device mode engine 120 serves to keep the record of activities performed by the unauthorized users and to ensure safety of the owner 101 of the mobile device 110. The records may be utilized to locate the mobile device 110, the owner 101, and/or the unauthorized users, to document a course of events, and later to prove the actions of the unauthorized users. One example of the modes configuration 130 to achieve the aforementioned purposes is presented herein.

In the first column "Feature", user activities available on the mobile device 110 and features of the device mode engine 120 are listed. In the second column "Standard Mode", how the respective activities of the first column are performed in the standard mode is presented. When the mobile device 110 operates in the standard mode, the device mode engine 120 only scans for the mode trigger words, and performs normally according to device settings and/or app settings. In the third column "Precaution Mode", how the respective activities of the first column are performed in the precaution mode is presented.

In the first row 310, a "Delete message" activity is specified. In the standard mode, as shown in the second column, the device mode engine 120 deletes a message as indicated by a user, as the user is either the owner or otherwise an authorized user. In the precaution mode, as shown in the third column, the device mode engine 120 logs the message, unknowingly to the unauthorized user, and then deletes the message as indicated by the user, as the user is an unauthorized user.

In the second row 320, a "Send message" activity is specified. In the standard mode, as shown in the second column, the device mode engine 120 sends a message as indicated by a user, as the user is authorized. In the precaution mode, as shown in the third column, the device mode engine 120 logs the message, unknowingly to the unauthorized user, and then sends the message as indicated by the user, as the user is unauthorized.

In the third row 330, a "Place phone call" activity is specified. In the standard mode, as shown in the second column, the device mode engine 120 places a call as indicated by a user, as the user is authorized. In the precaution mode, as shown in the third column, the device mode engine 120 logs contact information provided for the call, unknowingly to the unauthorized user, sends the call as indicated by the user, and records the call without alerting the user, to keep a comprehensive record of the call initiated by the unauthorized user.

In the fourth row 340, a "Precaution mode trigger word spoken" feature is specified. In the standard mode, as shown in the second column, the device mode engine 120 switches to the precaution mode, as the precaution mode trigger word has been pronounced by the user. In the precaution mode, as shown in the third column, the device mode engine 120 continues operating in the precaution mode, as the user may have already triggered the precaution mode without knowing, particularly if the unauthorized user spoke the precaution mode trigger word.

In the fifth row 350, a "Standard mode trigger word spoken" feature is specified. In the standard mode, as shown in the second column, the device mode engine 120 continues operating in the standard mode, as the standard mode trigger word may be set as a word frequently used by the owner in safety. In the precaution mode, as shown in the third column, the device mode engine 120 switches to the standard mode, as the user indicated that the precaution mode of operation is no longer necessary.

In the sixth row 360, a "GPS" feature, indicating global positioning system functionalities, is specified. In the standard mode, as shown in the second column, the device mode engine 120 operates according to the device setting and/or application (mobile app) setting of a location service. In the precaution mode, as shown in the third column, the device mode engine 120, unknowingly to the unauthorized user, periodically sends location data to the device modes server 160 and/or records location data in the secure storage 170 of the mobile device, according to preconfigured parameters for the device mode engine 120.

In the seventh row 370, a "Microphone" feature is specified. In the standard mode, as shown in the second column, the device mode engine 120 operates according to the device setting and/or application (mobile app) setting of a microphone in the mobile device 110. In the precaution mode, as shown in the third column, the device mode engine 120 records conversation and/or ambience, unknowingly to the unauthorized user, according to preconfigured voice recording parameters for the device mode engine 120. For example, the device mode engine 120 may record, in the secure storage 170 of the mobile device, speech and conversations continuously, record any discernable noise and/or periodically for a certain duration, and then send the voice recording to the device modes server 160.

In the eighth row 380, a "Camera" feature is specified. In the standard mode, as shown in the second column, the device mode engine 120 operates according to the device setting and/or application (mobile app) setting of a camera in the mobile device 110. In the precaution mode, as shown in the third column, the device mode engine 120 takes pictures, unknowingly to the unauthorized user, according to preconfigured image recording parameters for the device mode engine 120. For example, the device mode engine 120 may record, in the secure storage 170 of the mobile device, images of surroundings periodically, and then send the recorded images to the device modes server 160.

In the ninth row 390, an "Internet activity" feature is specified. In the standard mode, as shown in the second column, the device mode engine 120 accesses Internet without restriction. In the precaution mode, as shown in the third column, the device mode engine 120 records history and usage of Internet activities, unknowingly to the unauthorized user. The device mode engine 120 may record, in the secure storage 170 of the mobile device, Internet activity log, and then send the recorded log to the device modes server 160.

The modes configurations 130 may include further activities in two differentiated modes, or certain activities unique to either one of the modes, such as alerting the police upon a certain condition in the precaution mode.

Certain embodiments of the present invention may offer various technical computing advantages, including security features of a precaution mode triggered automatically based on cognitive verification of user identity, as well as based on a multi-layered authentication procedure. A secure storage allocated from system memory space is utilized to create hidden copies of deleted files and activity logs of operations performed by unauthorized users, without alerting the unauthorized users. Each precaution mode session is tracked based on identity of an unauthorized user in order to keep the precaution mode operations unknown to the unauthorized user. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The onboarding automation and performance optimization service may be provided for subscribed business entities in need from any location in the world.

Figure 4:
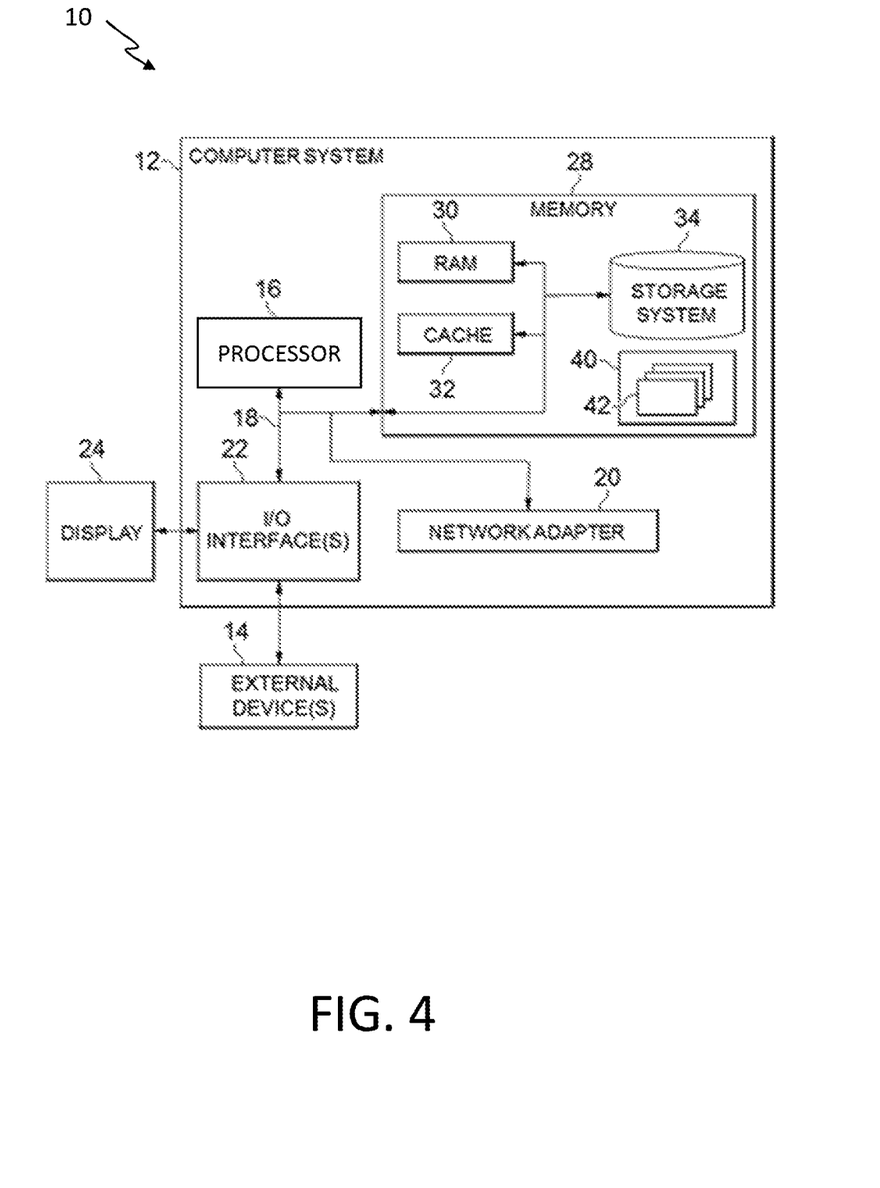
FIG. 4 depicts a cloud computing node according to an embodiment of the present invention.
Figure 5:
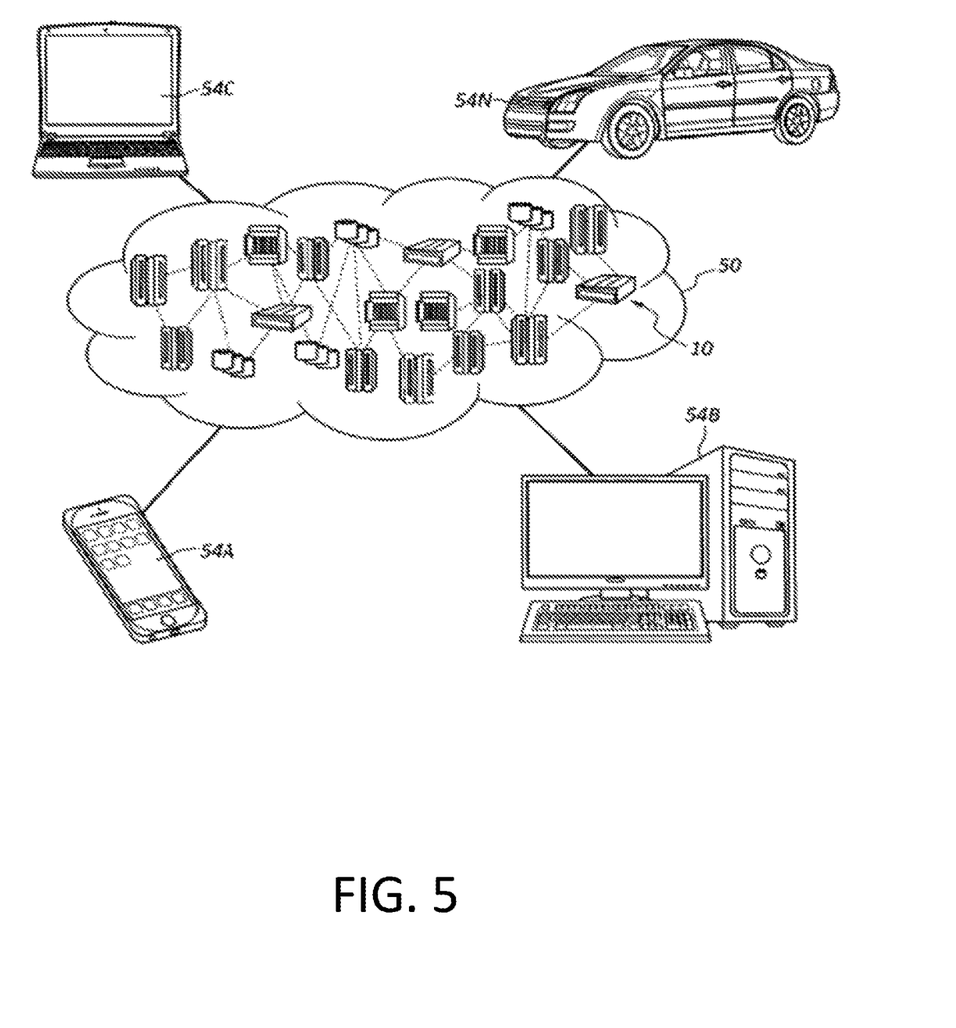
FIG. 5 depicts a cloud computing environment according to an embodiment of the present invention.
Figure 6:
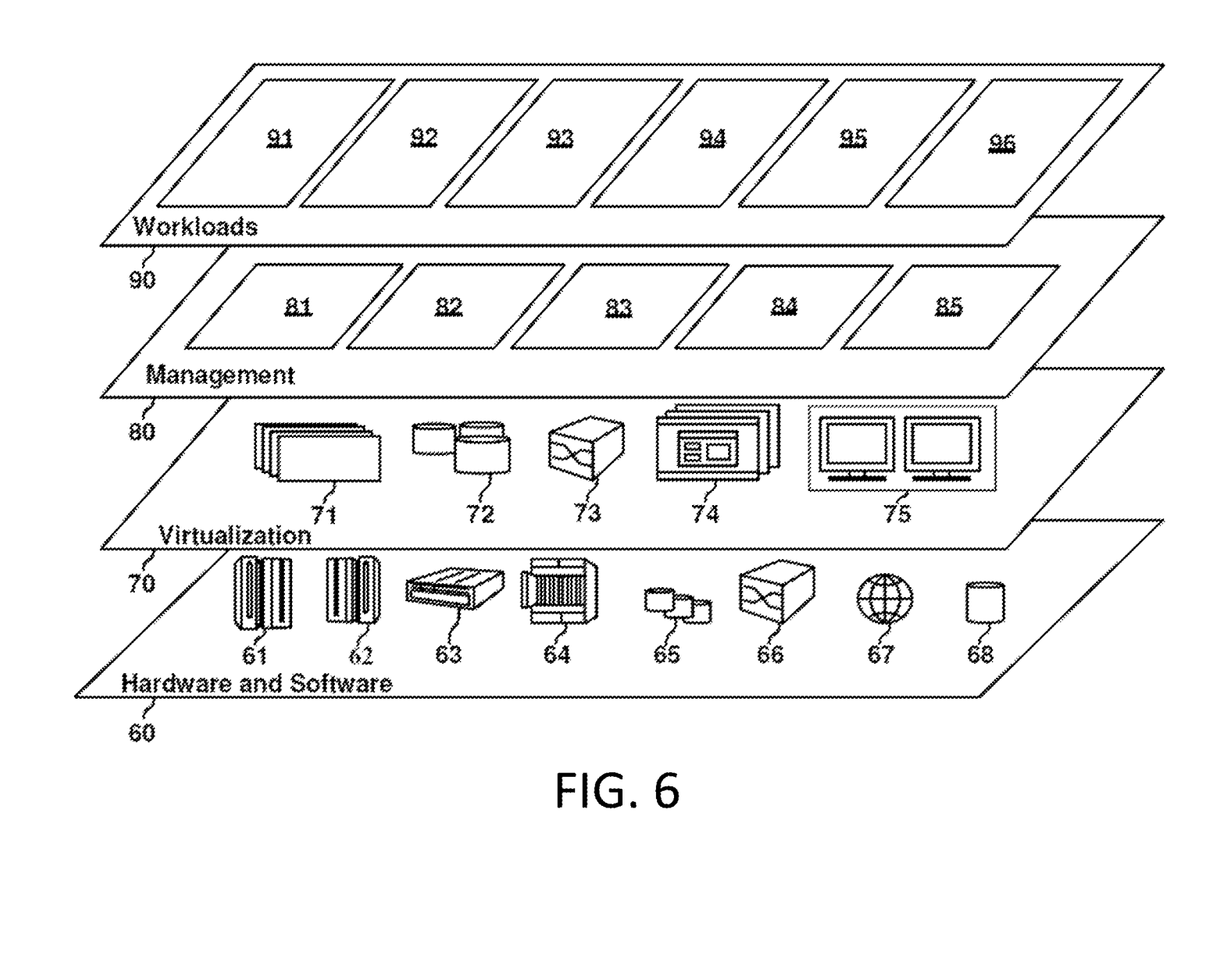
FIG. 6 depicts abstraction model layers according to an embodiment of the present invention.

FIGS. 4-6 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the device mode engine 120 and the device modes server 160 of FIG. 1, respectively. Program processes 42, as in device mode engine 120 the device modes server 160 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the device modes services as provided by the device modes server 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for providing a plurality of modes of operations on a mobile device, comprising:
   obtaining, by one or more processor, a user credential for login to the mobile device from a user;
   ascertaining that the user is unauthorized to use the mobile device by use of a multi-layered authentication and a discreet user identity verification; and
   performing operations on the mobile device according to predefined modes configurations corresponding to respective operations in a precaution mode, such that the mobile device may keep a secure record of the operations performed during a login session in the precaution mode, wherein the predefined modes configurations have respective operations in the precaution mode and a standard mode, for each activity requested on the mobile device, and wherein presence of the secure record is unknown to the user.

2. The computer implemented method of claim 1, further comprising:
   identifying the user who input the user credential by using one or more discreet technique such that the identifying may not alert the user, wherein the one or more discreet technique is selected from the group consisting of: three-dimensional (3D) touch pattern recognition, a facial image capture and recognition, and a voice capture and recognition.

3. The computer implemented method of claim 1, further comprising:

prior to the performing, ascertaining all sessions accessed by the user in the mobile device and respective activities performed by the user during each session, such that mobile device content is presented as consistent with results of the respective activities by the user.

4. The computer implemented method of claim 1, wherein the predefined modes configurations include an activity of a data deletion, with respective operations in the standard mode and the precaution mode, wherein the data deletion in the precaution mode comprising:
creating the secure record that is not accessible to end users including the user by storing data requested for the data deletion, wherein the secure record is either stored in a secure storage allocated within a system memory space or stored remotely via one or more device modes server; and
deleting the data requested for the data deletion as in the standard mode, wherein an owner of the mobile device, in the standard mode, may utilize the secure record to reinstate the data requested for the data deletion by the user in the precaution mode.

5. The computer implemented method of claim 1, wherein the predefined modes configurations include an activity of speech recognition on a standard mode trigger word, wherein the activity comprising:
detecting the standard mode trigger word from a voice recording, as captured for the precaution mode, wherein the voice recording is being processed with a speech recognition tool;
identifying the user by using one or more discreet technique such that the identifying may not alert the user; and
switching to the standard mode, in which operations defined for the standard mode from the predefined modes configurations would be performed.

6. The computer implemented method of claim 1, wherein the predefined modes configurations include camera activities for an embedded camera of the mobile device, and wherein the camera activities include: operating normally according to settings of apps and/or the mobile device in the standard mode; and, in the precaution mode, same operations as in the standard mode in addition to one or more periodic visual image capture, without alerting the user.

7. The computer implemented method of claim 1, wherein the predefined modes configurations include microphone activities for an embedded microphone of the mobile device, and wherein the microphone activities include: operating normally according to settings of apps and/or the mobile device in the standard mode; and, in the precaution mode, same operations as in the standard mode in addition to voice recording of speeches, without alerting the user.

8. The computer implemented method of claim 1, wherein the predefined modes configurations include Global Positioning System (GPS) activities for an embedded GPS of the mobile device, and wherein the GPS activities include: operating normally according to settings of apps and/or the mobile device in the standard mode; and, in the precaution mode, same operations as in the standard mode in addition to intermittent recording of GPS coordinates, without alerting the user.

9. The computer implemented method of claim 1, wherein the predefined modes configurations include an activity of sending a message, and wherein the message sending include: sending the message normally according to provided contact information in the standard mode; and, in the precaution mode, same operations as in the standard mode but recording the message and the provided contact information prior to sending, without alerting the user.

10. The computer implemented method of claim 1, wherein the predefined modes configurations include an activity of an online transaction, and wherein the online transaction includes: unrestricted access and transactions by the user in the standard mode; and, in the precaution mode, same operations as in the standard mode but recording the browsing history and details of the transactions concurrently, without alerting the user.

11. The computer implemented method of claim 1, wherein the predefined modes configurations include an activity of a phone call placement, and wherein the phone call placement includes: sending call normally to a specified phone number in the standard mode; and, in the precaution mode, same operations as in the standard mode but recording the phone number and conversation, without alerting the user.

12. A computer implemented method for providing a plurality of modes of operations on a mobile device, comprising:
obtaining, by one or more processor, a user credential for login to the mobile device from a user;
discovering that the user credential from the obtaining is a duress password; and
performing operations on the mobile device according to predefined modes configurations corresponding to respective operations in a precaution mode, such that the mobile device may keep a secure record of the operations performed during a login session in the precaution mode, wherein the predefined modes configurations have respective operations in the precaution mode and a standard mode, for each activity requested on the mobile device, and wherein presence of the secure record is unknown to the user.

13. The computer implemented method of claim 12, the performing comprising:
identifying the user by using one or more discreet technique such that the identifying may not alert the user, wherein the one or more discreet technique is selected from the group consisting of: three-dimensional (3D) touch pattern recognition, a facial image capture and recognition, and a voice capture and recognition;
ascertaining all sessions accessed by the user in the mobile device and respective activities performed by the user during each session, such that mobile device content is presented as consistent with results of the respective activities by the user.

14. The computer implemented method of claim 12, wherein the predefined modes configurations include an activity of a data deletion, with respective operations in the standard mode and the precaution mode, wherein the data deletion in the precaution mode comprising:
creating the secure record that is not accessible to end users including the user by storing data requested for the data deletion, wherein the secure record is either stored in a secure storage allocated within a system memory space or stored remotely via one or more device modes server; and
deleting the data requested for the data deletion as in the standard mode, wherein an owner of the mobile device, in the standard mode, may utilize the secure record to reinstate the data requested for the data deletion by the user in the precaution mode.

15. The computer implemented method of claim 12, wherein the predefined modes configurations include an activity of speech recognition on a standard mode trigger word, wherein the activity comprising:

detecting the standard mode trigger word from a voice recording, as captured for the precaution mode, wherein the voice recording is being processed with a speech recognition tool;

identifying the user by using one or more discreet technique such that the identifying may not alert the user;

switching to the standard mode, in which operations defined for the standard mode from the predefined modes configurations would be performed.

16. A computer implemented method for providing a plurality of modes of operations on a mobile device, comprising:

obtaining, by one or more processor, a user credential for login to the mobile device from a user;

discovering that the user credential from the obtaining is a normal password;

identifying the user by using one or more discreet technique such that the identifying may not alert the user;

ascertaining that the user is not one of authorized users including an owner of the mobile device; and     performing operations on the mobile device according to predefined modes configurations corresponding to respective operations in a precaution mode, such that the mobile device may keep a secure record of the operations performed during a login session in the precaution mode, wherein the predefined modes configurations have respective operations in the precaution mode and a standard mode, for each activity requested on the mobile device, and wherein presence of the secure record is unknown to the user.

17. The computer implemented method of claim 16, the identifying comprising:

identifying the user who input the normal password by using one or more discreet technique such that the identifying may not alert the user, wherein the one or more discreet technique is selected from the group consisting of: three-dimensional (3D) touch pattern recognition, a facial image capture and recognition, and a voice capture and recognition.

18. The computer implemented method of claim 16, further comprising:

prior to the performing, ascertaining all sessions accessed by the user in the mobile device and respective activities performed by the user during each session, such that mobile device content is presented as consistent with results of the respective activities by the user.

19. The computer implemented method of claim 16, wherein the predefined modes configurations include an activity of a data deletion, with respective operations in the standard mode and the precaution mode, wherein the data deletion in the precaution mode comprising:

creating the secure record that is not accessible to end users including the user by storing data requested for the data deletion, wherein the secure record is either stored in a secure storage allocated within a system memory space or stored remotely via one or more device modes server; and     deleting the data requested for the data deletion as in the standard mode, wherein an owner of the mobile device, in the standard mode, may utilize the secure record to reinstate the data requested for the data deletion by the user in the precaution mode.

20. The computer implemented method of claim 16, wherein the predefined modes configurations include an activity of speech recognition on a standard mode trigger word, wherein the activity comprising:

detecting the standard mode trigger word from a voice recording, as captured for the precaution mode, wherein the voice recording is being processed with a speech recognition tool;

identifying the user by using one or more discreet technique such that the identifying may not alert the user;

switching to the standard mode, in which operations defined for the standard mode from the predefined modes configurations would be performed.

\* \* \* \* \*